United States Patent
Murphy et al.

(10) Patent No.: US 12,292,961 B2
(45) Date of Patent: May 6, 2025

(54) ACCESS AND USAGE OF PRIVILEGED CREDENTIALS

(71) Applicant: JPMorgan Chase Bank, N.A., New York, NY (US)

(72) Inventors: Matthew Murphy, Wigan (GB); Rocky Maufort, Delaware, OH (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 213 days.

(21) Appl. No.: 18/076,329

(22) Filed: Dec. 6, 2022

(65) Prior Publication Data

US 2024/0184877 A1    Jun. 6, 2024

(51) Int. Cl.
  *G06F 21/45* (2013.01)
  *G06F 21/60* (2013.01)

(52) U.S. Cl.
  CPC ............ *G06F 21/45* (2013.01); *G06F 21/604* (2013.01)

(58) Field of Classification Search
  CPC ................................ G06F 21/45; G06F 21/604
  See application file for complete search history.

(56) References Cited

U.S. PATENT DOCUMENTS

| | | | | |
|---|---|---|---|---|
| 2009/0025084 A1* | 1/2009 | Siourthas | ............. | G06Q 20/405 726/25 |
| 2014/0031011 A1* | 1/2014 | West | ................... | G06F 21/6272 455/411 |
| 2016/0050531 A1* | 2/2016 | Choi | ..................... | H04W 4/023 455/456.2 |
| 2019/0305954 A1* | 10/2019 | Hamel | .................. | H04L 9/0897 |
| 2022/0131871 A1* | 4/2022 | Huang | .................... | G06F 16/22 |

OTHER PUBLICATIONS

Mustafa Al Lail. 2021. Poster: Towards Cloud-Based Software for Incorporating Time and Location into Access Control Decisions. In Proceedings of the 26th ACM Symposium on Access Control Models and Technologies (SACMAT '21). Association for Computing Machinery, New York, NY, USA, 55-57. (Year: 2021).*

A. v. Cleeff, W. Pieters and R. Wieringa, "Benefits of Location-Based Access Control: A Literature Study," 2010 IEEE/ACM Int'l Conference on Green Computing and Communications & Int'l Conference on Cyber, Physical and Social Computing, Hangzhou, China, 2010, pp. 739-746, (Year: 2010).*

* cited by examiner

*Primary Examiner* — Han Yang
*Assistant Examiner* — Phillip Emmanuel Wilson
(74) *Attorney, Agent, or Firm* — Greenblum & Bernstein, P.L.C.

(57) ABSTRACT

Implementations generally relate to access and usage of privileged credentials. In some implementations, a method includes receiving, from a mobile device, an access request for privileged credentials. The method further includes accessing one or more predetermined conditional access policies. The method further includes receiving location data associated with the mobile device. The method further includes performing a plurality of location-aware verification checks based on the one or more predetermined conditional access policies and the location data. The method further includes determining whether to grant or to deny the access request based on results from the plurality of location-aware verification checks.

20 Claims, 5 Drawing Sheets

500

ACCESS AND USAGE OF PRIVILEGED CREDENTIALS

BACKGROUND

Access to data in systems typically involves user login and authentication for security. For example, if a system verifies a username and password combination, the system gives a user access to data in the system. Otherwise, the system denies access. Real concerns for enterprises are cyberattacks and data breaches, which result from compromised endpoints and privileged credentials. It has become easier for hackers to obtain privileged account credentials, and it is often difficult to discover unauthorized access after it has occurred. As such, monitoring and protection of privileged accounts has become crucial, and most organizations implement privileged access management solutions.

DETAILED DESCRIPTION

Figure 1:
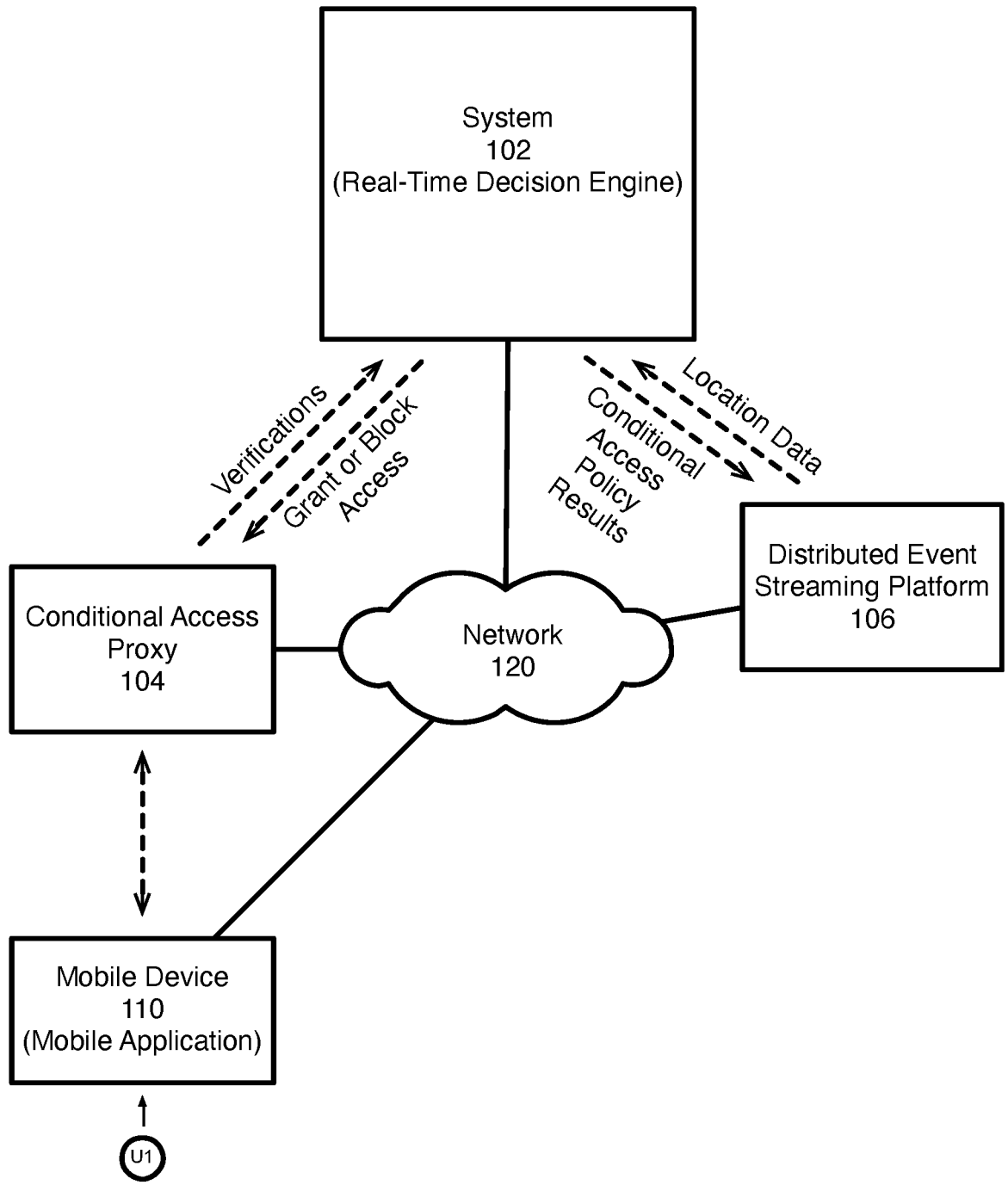
FIG. 1 is a block diagram of an example environment for managing access and usage of privileged credentials, which may be used for implementations described herein.

Implementations described herein enable, facilitate, and manage access and usage of privileged credentials. Privileged access management (PAM) solutions are designed to help organizations restrict privileged access to their environment by isolating the use of privileged accounts to reduce the risk of those credentials being stolen. PAM adds protection to privileged accounts. For example, protection may be added to administrator access to Windows hosts or Root access to Linux/Unix hosts and control access across a range of computers and applications on those computers. This reduces the opportunities for malicious users to gain access, while increasing the company's control and visibility in various environments.

PAM makes it more difficult for attackers to penetrate systems and obtain privileged account access with the establishment of a secure vault, the management of secrets, access delegation, session supervision and multi-factor authentication. Such controls enable organizations to see who their privileged account users are, what they are doing, and how the accounts are being used. However, these controls are unable to accurately restrict where privileged credentials can be accessed from or where they can be used.

To overcome these limitations, organizations have attempted to use IP addressing information and geolocation to create trusted internet protocol (IP) address ranges that can be used for making policy decisions. Administrators can specify entire countries' or regions' IP ranges to grant or block a user from extracting their privileged credentials from a vault. However, these IP location checks cannot be trusted to determine a user's location when granting access to a target system. This is because a bad actor could view the privileged credentials, store them, leave the approved trusted location, and then use the privileged credentials at an untrusted location for malicious intent or personal gain.

Geolocation or IP location data are often unreliable and do not provide the granularity, the level of accuracy, or the precision that is required to determine that an employee is in a specific location. Using trusted IP address ranges to determine a user's location is also often inaccurate and therefore unreliable. IP subnets can span multiple floors or buildings and the use of a virtual private network (VPN) can make a remote computer appear as if it is on the corporate network when working from a remote location. Additionally, IP addresses can be spoofed, where an attacker creates IP packets with a false source IP address to impersonate a particular computer system.

For applications that require access at specific locations, current systems may employ the Global Positioning System (GPS), which on its own is relatively unreliable. For example, a GPS receiver needs time to acquire signals from GPS satellites and can take between 5-10 minutes to start working. Further, the GPS radio signals go through different air and weather conditions while travelling to the earth, which can often delay the GPS signals and therefore affect the accuracy of the GPS receiver. In addition, buildings, trees, tunnels, mountains, clothing, as well as the human body can cause signal obstruction and, therefore, prevent GPS signals from the satellites from reaching the receiver. In particular, signals from GPS satellites can bounce off buildings, causing multipath errors that can confuse GPS receivers by the extra time the signal takes to reach it.

Managing and tracking IP addressing is complex and is even more complex in large organizations that have hundreds or thousands of locations throughout the world. There is a lack of real-time data availability. Also, the process is manual, which leads to human error. There are often multiple administrators for IP Management. As such, it is difficult to track changes to records and ensure accuracy. One common approach to provide IP address consistency and accuracy is to use an IP Address Management System (IPAM system), which helps to track IP address assignment. IPAM solutions alone are still not accurate enough to determine a user's precise location when the scope of the corporate network continues to expand, and this complexity increases with each new platform or technology initiative. Trusted IP ranges are still susceptible to IP spoofing.

Implementations described herein address these issues and provide various other benefits. The internet of everything (IoE) is emerging as a significant development in both information technology and operational technology, with the potential to increase convenience, efficiency, and safety. The IoE allows companies to bridge the physical and digital worlds, ingesting information and context through sensors from the physical world into the digital and taking actions in the physical world based on digital insights. IoE technologies are now being installed in corporate facilities to create smart or intelligent buildings.

Implementations described herein use data signals provided by smart building technologies including access control systems, proximity beacon systems, ultrasonic tracking systems, WI-FI® based positioning systems, and ultra-wideband technology systems, which are combined with a mobile companion application to create a dynamic location-aware privileged access management and conditional access system.

In various implementations, a system receives, from a mobile device, an access request for privileged credentials.

The system further accesses one or more predetermined conditional access policies. The system further receives location data associated with the mobile device. The system performs various location-aware verification checks based on the one or more of the predetermined conditional access policies and the location data. The system then determines whether to grant or to deny the access request based on results from the plurality of location-aware verification checks. Further example implementations directed to these features are described in more detail herein.

FIG. 1 is a block diagram of an example environment 100 for managing access and usage of privileged credentials, which may be used for implementations described herein. As shown, environment 100 includes a system 102 that implements a real-time decision engine, a conditional access proxy 104, a distributed event streaming platform 106, a mobile device 110 of a user U1, and a network 120. Conditional access proxy 104 and distributed event streaming platform 106 may communicate with system 102 and/or may communicate with each other directly or via system 102 via network 120. Also, as described in more detail herein, mobile device 110 communicates with conditional access proxy 104, as well as with distributed event streaming platform 106 via network 120 using a mobile application that facilitates the system in the access and usage of privileged credentials. Network 120 may be any suitable communication network such as a Wi-Fi® network, Bluetooth® network, the Internet, etc.

In various implementations, system 102 enables zero-trust location-aware privileged account access controls and location-aware privileged session access controls to be applied to the authentication process. Zero trust is an approach to designing security architectures based on the premise that every interaction begins in an untrusted state. Implementations use real-time data feeds sensed from the environment. This overcomes the deficiencies of conventional solutions available in the marketplace.

Location based access controls ensure that access to privileged accounts is granted only if a user is in a specific location (e.g., in a particular bank branch, on a particular office floor, in a specific room, in a specific seat, etc.). Location based session controls check that a given employee is still in that location before the privileged session is granted and can be established. The system continuously re-evaluates the access policies using the real-time data signals and blocks access to resources and revokes credentials if the location conditions change. In various implementations, the system sends conditional access policy results to a data store via distributed event streaming platform 106. Various example implementations directed to these features including the components of FIG. 1 are described in more detail herein in connection with FIGS. 2 and 3, for example.

For ease of illustration, FIG. 1 shows one block for each of system 102, conditional access proxy 104, and distributed event streaming platform 106. Blocks 102, 104, and 106 may each represent multiple respective systems, conditional access proxies, and distributed event streaming platforms. In other implementations, environment 100 may not have all of the components shown and/or may have other elements including other types of elements instead of, or in addition to, those shown herein.

While system 102 performs implementations described herein, in other implementations, any suitable component or combination of components associated with system 102 or any suitable processor or processors associated with system 102 may facilitate performing the implementations described herein.

Figure 2:
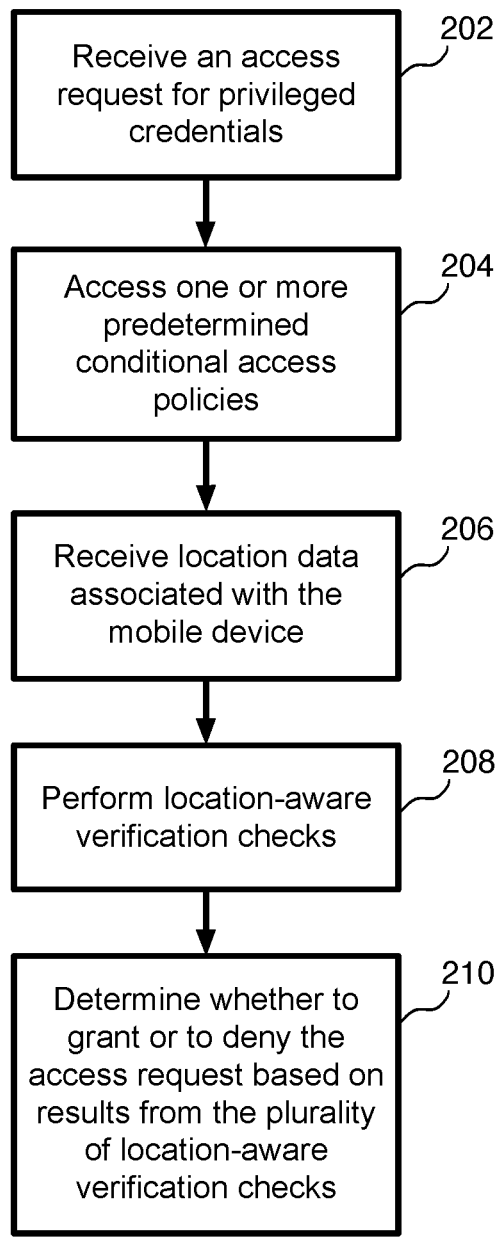
FIG. 2 is an example flow diagram for managing access and usage of privileged credentials, according to some implementations.

FIG. 2 is an example flow diagram for managing access and usage of privileged credentials, according to some implementations. Referring to both FIGS. 1 and 2, a method is initiated at block 202, where a system such as system 102 receives an access request for privileged credentials. The access request is received from a mobile device such as mobile device 110. The user U1 of mobile device 110 may be, for example, an employee of an enterprise. As described in more detail herein, system 102 determines whether to grant or deny the access request based on a variety of verifications (e.g., location-aware verification checks). Also, the system communicates with mobile device 110 via conditional access proxy 104. Operations directed to conditional access proxy 104 are described in more detail in connection with FIG. 3.

At block 204, the system accesses one or more predetermined conditional access policies. As described in more detail herein, the predetermined conditional access policies contain conditional access rule sets. These conditional access rule sets are based on real-time location data of mobile devices, and are used by the system to determine whether to grant or block access to privileged data in the system.

At block 206, the system receives location data associated with mobile device 110. As described in more detail herein, the location data associated with mobile device 110 is real-time location data that is collected by mobile application 312 and IPS feed 324, and sent to distributed event streaming platform 106. In various implementations, distribution event streaming platform 106 collects and sends location data, which includes location events, to system 102 for processing. Location data may include precise locations of mobile device 110, which may include particular floors, offices, seats, etc. in a given building. Operations directed to collection of location data via distribution event streaming platform 106 are described in more detail in connection with FIG. 3.

At block 208, the system performs various location-aware verification checks based on the one or more predetermined conditional access policies and the location data. For example, the system collects the location data and applies the location data against the conditional access policies. In various implementations, location events may include when mobile device 110 enters a particular location (e.g., floor, office, seat, etc.), when mobile device 110 leaves a particular location, and subsequent locations of mobile device 110.

At block 210, the system determines whether to grant or to deny the access request based on results from the location-aware verification checks. As indicated above, the predetermined conditional access policies contain conditional access rule sets. The system determines whether the rule sets are satisfied based on the real-time location data. If the rule sets are satisfied, the system grants access to privileged data such as privileged credentials in the system. Otherwise, if the rule sets are not satisfied, the system denies the access request and blocks access to privileged credentials and other privileged data in the system. Further example implementations associated with these steps are described in more detail herein in connection with FIG. 3.

Although the steps, operations, or computations may be presented in a specific order, the order may be changed in particular implementations. Other orderings of the steps are possible, depending on the particular implementation. In some particular implementations, multiple steps shown as sequential in this specification may be performed at the same time. Also, some implementations may not have all of the steps shown and/or may have other steps instead of, or in addition to, those shown herein.

Figure 3:
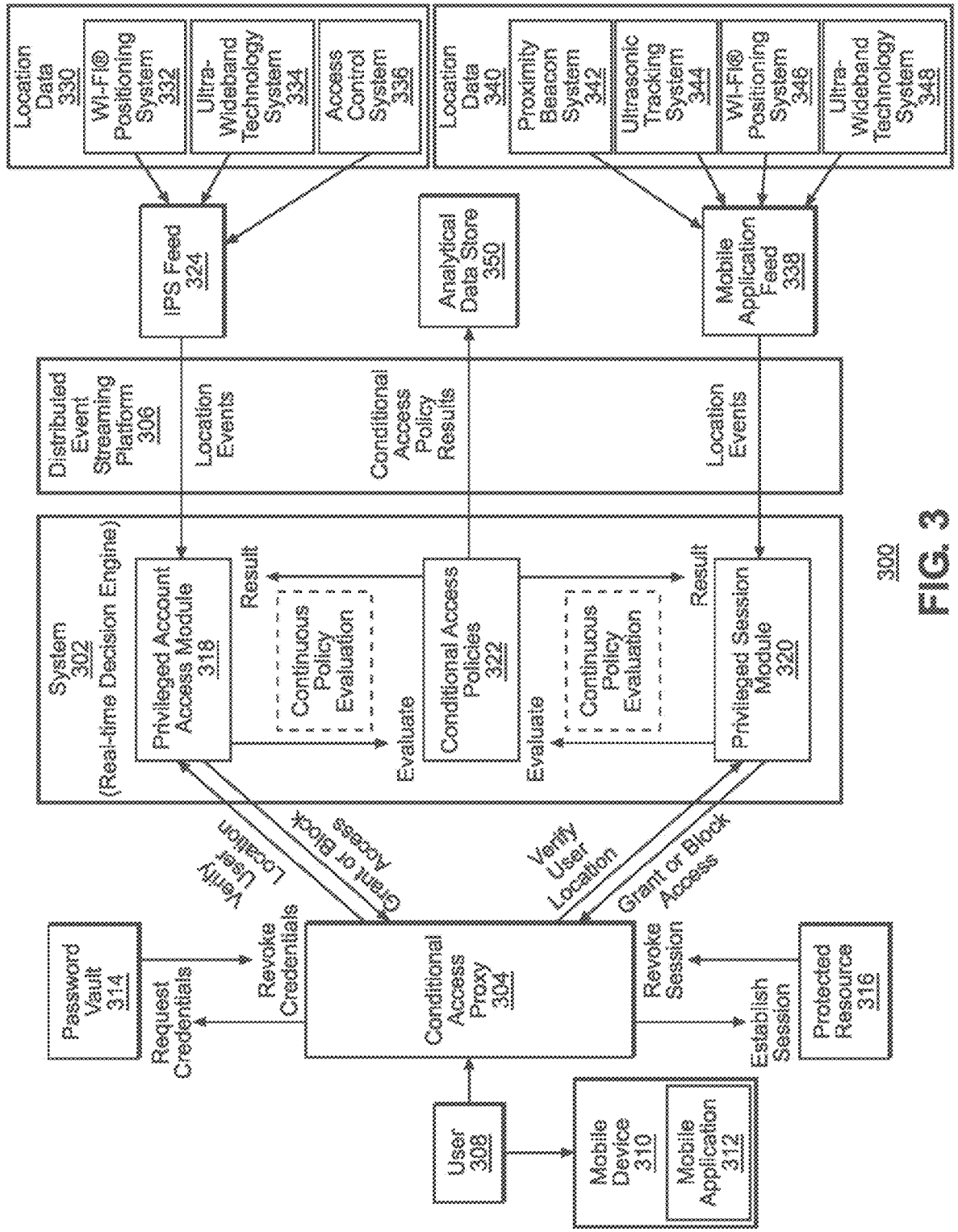
FIG. 3 is a block diagram of an example environment for managing access and usage of privileged credentials, which may be used for implementations described herein.

FIG. 3 is a block diagram of an example environment 100 for managing access and usage of privileged credentials, which may be used for implementations described herein. Shown is a system 302, which implements a real-time decision engine, a conditional access proxy 304, and a distributed event streaming platform 306. Conditional access proxy 304 communicates with a user 308 via a mobile application 312.

In various implementations, conditional access proxy 304 is the execution engine that is used when a user 308 opens a privileged access management (PAM) application 310 (not shown). In various implementations, PAM application 310 does not run on mobile device 310. PAM application 310 runs on a corporate PC such that there is a physical separation between PAM application 310 and mobile application 312 on mobile device 310. Their session is redirected to conditional access proxy 304. System 302 directs user 308 to open the companion mobile application 312 on their mobile device 310 to validate their location. In various implementations, mobile application 312 requires authentication in the form of a pin code or biometric verification (e.g., face recognition, fingerprint, or retinal scan, etc.). Mobile application 312 evaluates any configured client-side rules via one or more of the position location systems (e.g., proximity beacon system, ultrasonic tracking system, Wi-Fi® positioning system, and ultra-wideband technology system, etc.) and sends the results to the real-time decision engine. Conditional access proxy 304 controls user sessions by redirecting mobile device 310 of user 308 through a reverse proxy instead of directly to the application or the protected resource 316. From then on, user 308 makes access requests and responses go through conditional access proxy 304 rather than directly to the application or protected resource 316. If the user is in an appropriate location based on conditional access policies, system 302 enables the PAM application to open and allows the user to initiate the process to checkout their privileged account credentials. If the rules are evaluated incorrectly then credentials are revoked. Policy results are sent to the analytical data store 350.

In various implementations, conditional access proxy 304 functions as an intermediary between mobile device 310 or user 308 requesting privileged credentials or other protected resources and system 302, which provides the protected resources. Conditional access proxy 304 requests privileged credentials by sending an access request for privileged credentials to a password vault 314 of system 302. If the system grants the access request, conditional access proxy 304 allows access to a protected resource 316, which includes the privileged credentials and other privileged data of the system.

System 302 includes a privileged account access module 318, a privileged session module 320, and conditional access policies 322. System 302 implements a real-time decision engine that has two modules, which include location-aware privileged account access module 318 and privileged session module 320. These modules 318 and 320 run perpetual queries against the streams of location data 330 and 340, filters, and aggregates the location data 330 and 340 to evaluate the conditional access policies 322 and then grant or block access to the resource. For example, these modules of system 302 may block or allow mobile device 310 of user 308 to establish a connection to the target system.

In various implementations, privileged account access module 318 receives location events from an indoor positioning system (IPS) feed 324 via distributed event streaming platform 306. IPS feed 324 is sourced by location data 330. Location data 330 includes location data events provided by a Wi-Fi® positioning system 332, an ultra-wideband technology system 334, and an access control system 336. Also privileged session module 320 receives location events from a mobile application feed 338 via distributed event streaming platform 306. Mobile application feed 338 is sourced by location data 340. Location data 340 includes location data events provided by a proximity beacon system 342, an ultrasonic tracking system 344, a Wi-Fi® positioning system 346, and an ultra-wideband technology system 348. Operations of these sources of location data 330 and 340 are described in more detail herein.

System 302 implements a real-time data processing or data streaming program, where location signals provided by smart building technology sensors are processed immediately. Real-time processing requires continual input from all IT systems for location data points (e.g., access control systems, proximity beacon systems, ultrasonic tracking systems, Wi-Fi® positioning systems, and ultra-wideband technology systems, etc.). Real-time processing also requires constant processing, and provides a steady output of data that determines if the user's location has changed.

System 302 ingests location data 330 and 340 and using distributed event streaming platform 306, which may be implemented by a distributed event streaming platform such as APACHE KAFKA®, which is capable of handling trillions of events per day. System 302 processes steams of captured location data signals in real-time and processes these signals with minimal latency to generate automated responses or real-time decisioning with regard to access requests. System 302 writes processed location data and policy-conditional access policy results to analytical data store 350, which is optimized for analytics and visualization.

In various implementations, conditional access policies 322 are predetermined location-aware conditional access policies that enable an organization to use location-driven signals (e.g., location data 330 and 340, etc.) as part of their access control decisions. As indicated above, conditional access policies 322 contain conditional access rule sets. These conditional access rule sets are based on real-time location data of mobile devices, and are used by the system to determine whether to grant or block access to privileged data in the system. A system administrator creates a conditional access policy that uses location signals provided by smart building or IoT technologies to grant or block access to a resource. Conditional access policies 322 may be predetermined and set by the system administrator, and different conditional access policies 322 may apply to different situations. For example, conditional access policies 322 may restrict access to privileged credentials and other protected resources to particular buildings, to particular floors, to particular offices, to particular seats, etc. The scope or area of access may vary and will depend on the particular implementation.

In various implementations, conditional access policies 322 at their simplest form may contain if-then statements, which add restrictions until the rules have been evaluated and passed. If a user such as user 308 wants to access a protected resource 316, the user needs to complete an action. For example, if a mainframe administrator wants to restart the payroll application, that user may be required to use multifactor authentication to access it from within a corporate facility.

In various implementations, system 302 aggregates location signals such as location data 330 and 340 and compares the location signals against conditional access policies 322 in order to make decisions on whether to grant or deny access requests, and to enforce the organizational policies. As indicated above, location data 330 and 340 includes location data received from various IoT sources including Wi-Fi® positioning systems 332 and 346, ultra-wideband technology systems 334 and 348, access control system 336, proximity beacon system 342, and ultrasonic tracking system 344. In various implementations, policy administrators may choose to combine these location signals using logical OR and logical AND operators. For example, an administration may program system 302 and its conditional access policies 322 to enforce all selected controls (e.g., control 1 AND control 2, etc.) or enforce one or more of the selected controls (e.g., control 1 OR control 2, etc.).

The following descriptions describe operations of sources of location data 330 and 340. As indicated above, these sources include Wi-Fi® positioning system 332, ultra-wideband technology system 334, access control system 336, proximity beacon system 342, ultrasonic tracking system 344, Wi-Fi® positioning system 346, and ultra-wideband technology system 348.

In various implementations, at least one of the predetermined conditional access policies requires at least one location-aware verification check associated with an access control system to pass in order to grant the access request. In various implementations, access control system 336 provides a physical verification check of a user's location. Access control system 336 enables organizations to safely manage the flow of people throughout their premises and protect vital assets. For example, electronic door access controls may be in place to restrict members of the public and employees from gaining access to a building or floor without first obtaining permission. Access control system 336 may apply controls to elevators to further restrict the movement of people.

Access control system 336 may be used by the location-aware privileged account access module 318 to prove and verify that an employee is in a building, on a designated floor before allowing them to extract their privileged credentials from the password vault 314. For example, if an employee works on the $2^{nd}$ floor in John Carpenter Street, London, then location signals from access control system 336 will show that they swiped their badge to enter the building and then swiped their badge to enter the floor. If elevator controls are in use, access control system 336 provides more signals to further verify the employee's location in the building.

The location-aware privileged session module 320 may then use these location signals to prove and verify that the employee is still in the building, and on the same floor, before access to the protected resource is granted. Access control system 336 may require employees to swipe their badge to leave the floor or the building. If there is a change in the user's location, for example, access control system 336 may send a signal that the user had swiped their badge to leave the building. Privileged session module 320 would generate an event, which would cause the privileged session to be disconnected and the privileged credentials to be invalidated.

In some scenarios, this location verification could be affected by the problem of tailgating, where one employee swipes their badge and another employee walks through the door behind them. Employees are trained and encouraged not to condone such behavior. However, if this were to occur, other location-aware signals described herein mitigate the risk. In some implementations, the system may apply a default block, which would prevent the credentials from being accessed if there was no record that the employee used their badge to access the floor that they work on.

In various implementations, at least one of the predetermined conditional access policies requires at least one location-aware verification check associated with a proximity beacon system to pass in order to grant the access request. In various implementations, proximity beacon system 342 provides a signal strength verification check of a user's location. Proximity beacon system 342 employs small, low-cost, low-powered devices that broadcast Bluetooth® low energy (BLE) signals. Beacon signals contain data that is used to describe a physical location. Using received signal strength beacons can determine whether a device is in the proximity of a specific location (e.g., building, office, floor, room, etc.), which can be used by system 302 to trigger actions requiring a more precise location (e.g., 1-3 feet), etc. Beacons do not execute functionality, but simply send out a signal that when detected by a BLE enabled device or application could then initiate an action (e.g., notify a backend service of the user's location in a building, etc.).

Beacon proximity is not a certain correlation to distance, but a level of confidence of distance proximity based on signal strength. For example, proximity in APPLE®'s iBeacons is broken into 4 proximity levels: immediate, near, far, and unknown. With regard to the immediate level, there is a high confidence that a device is very close to beacon (e.g., within inches). With regard to the near level, there is a clear line of sight to the beacon (e.g., a device is within 1-3 meters from a beacon, etc.). With regard to the far level, a beacon signal is detected but due to low signal strength, the confidence level is too low to determine immediate or near proximity. With regard to the unknown level, a beacon signal is detected, but there is not enough information to determine if proximity is immediate, near, or far.

In various scenarios, proximity beacons may be installed and configured on each floor in a building. A device that supports APPLE® iBeacon or GOOGLE® Eddystone protocols establish a beacon region based on beacon signals from these proximity beacons. This enables a device to determine when it has entered or left a region, along with a proximity to the beacon.

In various implementations, beacons may include a universally unique identifier (UUID), which may be represented as a string (e.g., B9407F30-F5F8-466E-AFF9-25556B57FE6D). This UUID may be used to represent a city (e.g., London, etc.). In some implementations, the UUID may include a major number such as an unsigned short integer (e.g., an integer ranging from 1 to 65535), which is used to represent the building ID (e.g., John Carpenter Street, etc.). The UUID may also include a minor number, also an unsigned short integer, like a major number. The minor number may be used to represent a floor (e.g., the $2^{nd}$ floor, etc.).

The system may use proximity beacons as advertisements in mobile application 312 to enable location-aware privileged account access module 318 and privileged session module 320 to prove and verify that an employee is in a near or immediate vicinity of the beacon before allowing them to extract and use their privileged credentials. For example, if an employee works on the $2^{nd}$ floor on John Carpenter Street, London, mobile application 312 will detect beacon advertisements. The system will then compare the UUID detected with the UUID for the city. The system then checks the major number against the building ID. The system then checks the minor number against the floor number. For example, the UUID may have a string B9407F330-F5F8-

466E-AFF9-25556B57FE6D, Major=10, Minor=2, which would be evaluated to London, John Carpenter Street, $2^{nd}$ floor.

A proximity distance of a proximity level "immediate" or proximity level "near" would verify that the user entered the beacon region and is located within 1-3 meters or inches of the beacon's location on the floor. If there is a change in the user's location (e.g., the user leaves the beacon region or enters another region, etc.), mobile application 312 generates an event, which would cause the privileged session to be disconnected and the privileged credentials to be invalidated.

In various implementations, at least one of the predetermined conditional access policies requires at least one location-aware verification check associated with an ultrasonic tracking system to pass in order to grant the access request. In various implementations, ultrasonic tracking system 344 provides a sound verification check of a user's location. Ultrasonic tracking system 344 uses soundwaves that are picked up by a microphone of mobile device 310 to gather data and pinpoint a user's location. This pattern utilizes sounds that cannot be heard by humans but that can be detected by devices such as mobile device 310 or other mobile devices, including smartphones and tablets. Ultrasonic sound waves are those with a frequency that is too high (generally above 18 kHz) to be audible to the human ear. For example, a dog whistle makes ultrasonic sounds that a dog can hear, but humans cannot hear.

In various implementations, ultrasonic tracking system 344 encodes ultrasonic sounds with location data to create advertisements or beacons, which are used to represent a building and a floor in that building. These ultrasonic beacons emit their audio sequences using speakers that are detected by the microphone of mobile device 310, which is accessed by the companion mobile application 312. Mobile application 312 detects the signal to prove and verify that an employee is on a floor near the vicinity of their desk before allowing them to extract and use their privileged credentials.

If an employee works on the $2^{nd}$ floor in John Carpenter Street, London, mobile application 312 detects the ultrasonic beacon. The system extracts the location data from the sound waves and compares the location data with the building ID and checks against the floor number. This is the same technique of how data is encapsulated in Bluetooth® low energy (BLE) signals, except that it uses sound waves instead. If there is a change in the user's location (e.g., the microphone no longer detects the ultrasonic beacons, etc.), mobile application 312 generates an event, which would cause the privileged session to be disconnected and the privileged credentials to be invalidated.

In various implementations, at least one of the predetermined conditional access policies requires at least one location-aware verification check associated with a Wi-Fi® positioning system to pass in order to grant the access request. Wi-Fi® positioning systems 332 and 346 provide signal strength verification checks of a user's location. Wi-Fi® positioning systems 332 and 346 are each a geolocation system that uses the characteristics of nearby Wi-Fi® access points or Wi-Fi® hotspots to discover where a device is located. The Wi-Fi® radio frequency is used to detect and locate transmitting Wi-Fi® devices, such as smartphones throughout indoor spaces.

Wi-Fi® positioning techniques determine the user's location by using a measurement called a received signal strength indicator (RSSI), which is used primarily for device multi-lateration. This is a signal strength-based approach that is used to determine a device's location within a building. RSSI multi-lateration uses multiple access points (APs) that are deployed in a fixed position to detect transmitting Wi-Fi® devices and the received signal strength of the signal from the device. The location data collected by the APs is sent to an indoor positioning system (IPS) or real-time location system (RTLS). The location engine analyses the data to estimate the location of the transmitting device.

An indoor positioning system (IPS) is a network of devices used to locate people or objects where GPS and other satellite technologies lack precision or fail entirely, such as inside multistory buildings, airports, alleys, parking garages, underground locations, etc. Wi-Fi® advertisements are used in mobile application 312 to prove and verify that an employee is on a floor in the vicinity of an access point before allowing them to extract and use their privileged credentials. Mobile application 312 performs a client-side verification and checks that mobile device 310 is connected to a trusted corporate service set identifier (SSID). Mobile application 312 then uses the signal strength of nearby APs relative to itself to determine its location, which will be combined with the wireless access points SSID and media access control (MAC) address as a method of fingerprinting the location (e.g., connected to access point 2 on John Carpenter Street on the $2^{nd}$ floor).

Once the client-side verification has been completed, a server-side or multi-factor verification is performed. Location-aware privileged account access module 318 and privileged session module 320 ingest the IPS or RTLS location data. The location of mobile device 310 reported by the APs is compared with the location provided by mobile application 312. The AP data feeds verify that the device is connected to access point 2 on John Carpenter Street on the $2^{nd}$ floor using the device attributes (e.g., MAC Address, hostname, etc.).

If there is a change in the user's location (e.g., the AP no longer detects the device or the mobile application fails to detect the AP), mobile application 312 generates an event, which causes the privileged session to be disconnected and the privileged credentials to be invalidated.

In various implementations, at least one of the predetermined conditional access policies requires at least one location-aware verification check associated with an ultra-wideband technology system to pass in order to grant the access request. Ultra-wideband technology systems 334 and 348 provide a radio frequency verification check of a user's location. Ultra-wideband technology (UWB) is a short-range RF technology for wireless communication that can be leveraged to detect the location of people, devices, and assets with unrivalled precision. UWB may be used to transmit data between devices using radio waves, and it does so with short nanosecond pulses over an ultra-wide range of frequencies. UWB indoor positioning systems provide a higher level of location precision when compared with Bluetooth® or Wi-Fi® systems and can pinpoint a location in real time to within 20-50 centimeters or less. UWB systems precisely detect locations due to its distance-based measurement or time-of-flight (ToF), which calculates location based on how long it takes for pulses of radio waves to travel from one device to another.

UWB positioning techniques can precisely measure the distance between transceivers by calculating the time it takes for signals to travel amongst the devices. For UWB positioning, the two primary techniques that will be used are Time difference of arrival (TDoA) and two way Ranging (TWR). TDoA uses UWB sensors that are anchored in a fixed position throughout the indoor space. These sensors will detect the locate the transmitting UWB device, such as mobile device 310. Mobile device 310 transmit signals in regular intervals, which are received by the UWB sensors that are in communication range and are time-stamped by the sensors. All the time-stamped data is then sent to the central indoor positioning system (IPS) or real-time location system (RTLS).

TWR uses two-way communication between mobile device 310 and a UWB sensor to sense the distance between them. With TWR, when a mobile device is in close proximity to another device, the two devices will start ranging each other to determine their distance. The time it takes a signal to travel between them is then multiplied by the speed of light and used to determine their relative positions, frequently to enable location-aware communication.

UWB advertisements are used in mobile application 312 to prove and verify that an employee is on a floor in the immediate vicinity of the sensor before allowing them to extract and use their privileged credentials. Mobile application 312 performs a client-side verification using two-way ranging (TWR) to sense the distance between the phone and the UWB enabled access point. This method fingerprints the location (e.g., connected to access point 2 in John Carpenter Street on the $2^{nd}$ floor).

Once the client-side verification has been completed, the system performs a server-side or multi-factor verification using TDoA. Location-aware privileged account access 318 and privileged session modules 320 ingest the IPS or RTLS location data. The system compares the location for mobile device 310 reported by the UWB enabled access points with the location provided by mobile application 312. The AP data feeds verify that the mobile device 310 is connected to access point 2 in John Carpenter Street on the $2^{nd}$ floor using the device attributes. (MAC Address, hostname, etc.).

If there is a change in the user's location (e.g., the UWB enabled access point no longer detects the device or the mobile application fails to range the distance to the UWB access point), mobile application 312 generates an event, which causes the privileged session to be disconnected and the privileged credentials to be invalidated. As indicated above in various example implementations, system 302 continuously re-evaluates the location data based on the one or more location data access policies. The system determines whether to block access to resources and revoke credentials based on changes to location data.

The following are example implementations directed to the privileged account access module 318. In some implementations, user 308 opens a privileged access management (PAM) application 310, and their session is redirected to conditional access proxy 304. System 302 directs user 308 to open the companion mobile application 312 on their mobile device 310 to validate their location. Mobile application 312 requires authentication in the form of a pin code or biometric verification (e.g., face recognition, fingerprint, or retinal scan, etc.). Mobile application 312 evaluates any configured client-side rules via one or more of the position location systems (e.g., proximity beacon system, ultrasonic tracking system, Wi-Fi® positioning system, and ultra-wideband technology system, etc.) and sends the results to the real-time decision engine. Privileged account access module 318 evaluates any configured server-side rules (e.g., access control system, Wi-Fi® positioning system, ultra-wideband technology system, etc.), and compares the results with the data sent from the mobile application 312, which verifies the user's precise location. If the rules are evaluated correctly, then access is granted. The privileged access management (PAM) application opens and allows the user to initiate the process to checkout their privileged account credentials. If the rules are evaluated incorrectly then credentials are revoked. The user is asked to relocate to an approved location. Policy results are sent to the analytical data store 350.

The following are example implementations directed to the privileged session module 320. User 308 initials a privileged session to a protected resource (computer or application) and their session is redirected to the conditional access proxy 304. The system directs the user to open the companion mobile application 312 on their mobile device 310 to validate their location. Mobile application 312 requires authentication in the form of a pin code or biometric verification (e.g., face recognition, fingerprint, or retinal scan, etc.). Mobile application 312 evaluates any configured client-side rules (e.g., proximity beacon system, ultrasonic tracking system, Wi-Fi® positioning system, and ultra-wideband technology system) and sends the results to the real-time decision engine. The privileged session module 320 evaluates any configured server-side rules (e.g., access control system, Wi-Fi® positioning system, and ultra-wideband technology system, etc.), compares the results with the data sent from the companion application, which verifies the user's precise location. If the rules are evaluated correctly then access is granted, and the privileged access management (PAM) application opens and allows the user to initiate the connection to the protected resource. If the rules are evaluated incorrectly then the session and credentials are revoked. The user is asked to relocate to an approved location. Policy results are sent to the analytical data store.

Implementations described herein provide various benefits. For example, implementations of the privileged access management system make it harder for a bad actor to obtain privileged credentials, as well as to accurately restrict or allow where the credentials can be accessed from or accurately apply restrictions to where they can be used. Privileged access is evaluated and re-evaluated using real-time data feeds sensed from the environment. Implementations determine that a user is in a specific location. Implementations ensure that privileged accounts can only be accessed in that specific location and only by the designated user. Implementations ensure that privileged sessions can only be established from that specific location and only by the designated user. Implementations also provide capability for location detection to be provided by various IoT and building systems. Implementations also provide multiple factor location aware checks that are performed when the privileged credentials are accessed and when they are used. Implementations also provide a higher level of accuracy and precision when compared with geo-location or trusted IP ranges. Implementations evaluate and continuously re-evaluate the access policies using the real-time data signals sensed from the environment. Implementations also block access to resources and revoke credentials if the location conditions change.

Figure 4:
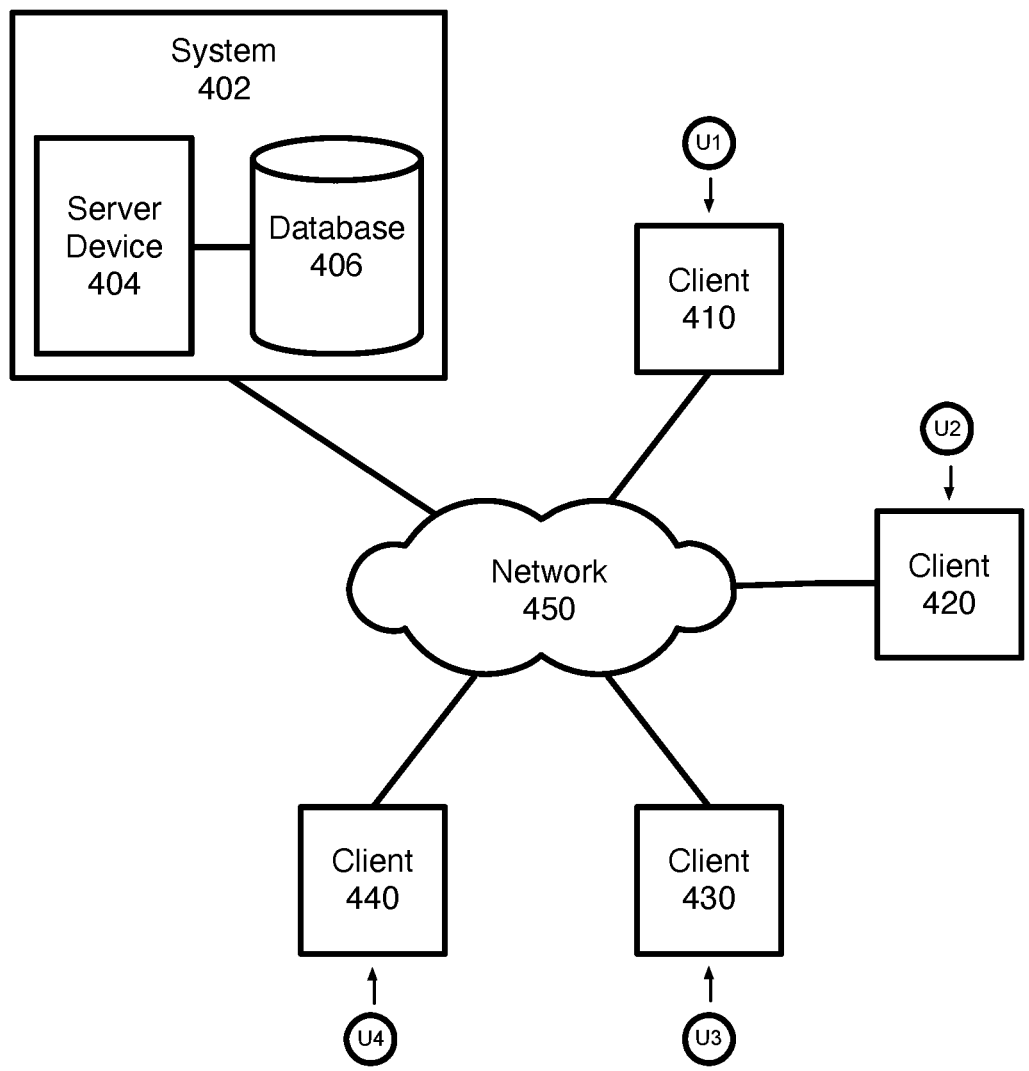
FIG. 4 is a block diagram of an example network environment, which may be used for some implementations described herein.

FIG. 4 is a block diagram of an example network environment 400, which may be used for some implementations described herein. In some implementations, network environment 400 includes a system 402, which includes a server device 404 and a database 406. For example, system 402 may be used to implement system 102 of FIG. 1, and/or system 302 of FIG. 3, as well as to perform implementations described herein. Network environment 400 also includes client devices 410, 420, 430, and 440, which may communicate with system 402 and/or may communicate with each other directly or via system 402. Network environment 400 also includes a network 450 through which system 402 and client devices 410, 420, 430, and 440 communicate. Network 450 may be any suitable communication network such as a Wi-Fi® network, Bluetooth® network, the Internet, etc.

For ease of illustration, FIG. 4 shows one block for each of system 402, server device 404, and network database 406, and shows four blocks for client devices 410, 420, 430, and 440. Blocks 402, 404, and 406 may represent multiple systems, server devices, and network databases. Also, there may be any number of client devices. In other implementations, environment 400 may not have all of the components shown and/or may have other elements including other types of elements instead of, or in addition to, those shown herein.

While server device 404 of system 402 performs implementations described herein, in other implementations, any suitable component or combination of components associated with system 402 or any suitable processor or processors associated with system 402 may facilitate performing the implementations described herein.

In the various implementations described herein, a processor of system 402 and/or a processor of any client device 410, 420, 430, and 440 cause the elements described herein (e.g., information, etc.) to be displayed in a user interface on one or more display screens.

Figure 5:
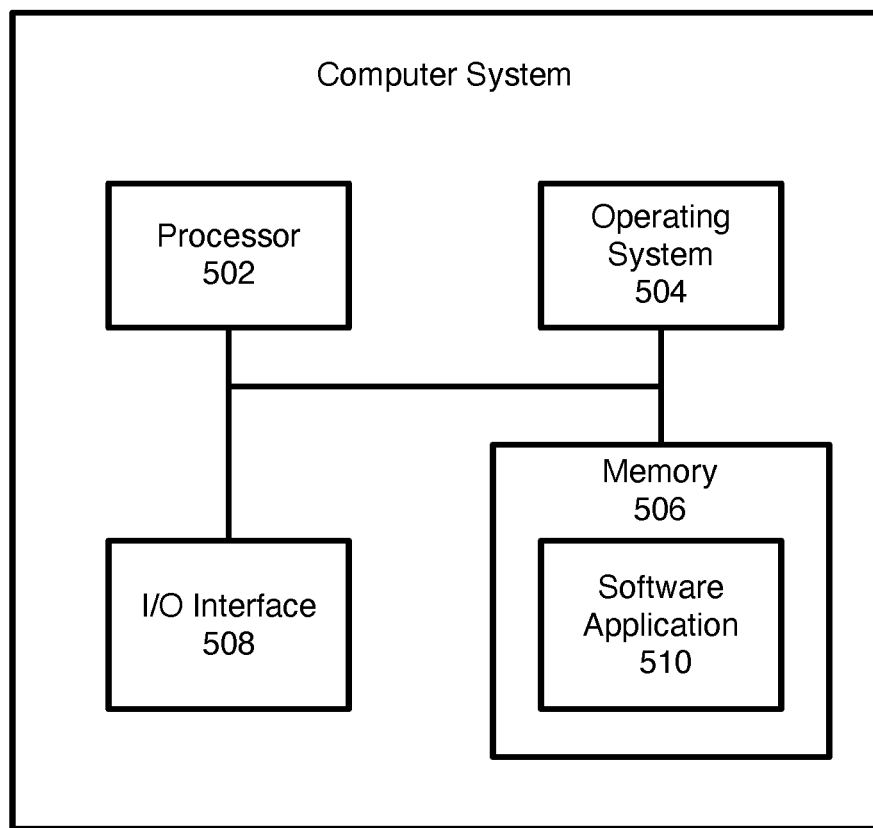
FIG. 5 is a block diagram of an example computer system, which may be used for implementations described herein.

FIG. 5 is a block diagram of an example computer system 500, which may be used for some implementations described herein. For example, computer system 500 may be used to implement system 102 of FIG. 1, system 302 of FIG. 3, and/or server device 404 of FIG. 4, as well as to perform implementations described herein. In some implementations, computer system 500 may include a processor 502, an operating system 504, a memory 506, and an input/output (I/O) interface 508. In various implementations, processor 502 may be used to implement various functions and features described herein, as well as to perform the method implementations described herein. While processor 502 is described as performing implementations described herein, any suitable component or combination of components of computer system 500 or any suitable processor or processors associated with computer system 500 or any suitable system may perform the steps described. Implementations described herein may be carried out on a user device, on a server, or a combination of both.

Computer system 500 also includes a software application 510, which may be stored on memory 506 or on any other suitable storage location or computer-readable medium. Software application 510 provides instructions that enable processor 502 to perform the implementations described herein and other functions. Software application 510 may also include an engine such as a network engine for performing various functions associated with one or more networks and network communications. The components of computer system 500 may be implemented by one or more processors or any combination of hardware devices, as well as any combination of hardware, software, firmware, etc.

For ease of illustration, FIG. 5 shows one block for each of processor 502, operating system 504, memory 506, I/O interface 508, and software application 510. These blocks 502, 504, 506, 508, and 510 may represent multiple processors, operating systems, memories, I/O interfaces, and software applications. In various implementations, computer system 500 may not have all of the components shown and/or may have other elements including other types of components instead of, or in addition to, those shown herein.

Although the description has been described with respect to particular implementations thereof, these particular implementations are merely illustrative, and not restrictive. Concepts illustrated in the examples may be applied to other examples and implementations.

In various implementations, software is encoded in one or more non-transitory computer-readable media for execution by one or more processors. The software when executed by one or more processors is operable to perform the implementations described herein and other functions.

Any suitable programming language can be used to implement the routines of particular implementations including C, C++, C#, Java, JavaScript, assembly language, etc. Different programming techniques can be employed such as procedural or object oriented. The routines can execute on a single processing device or multiple processors. Although the steps, operations, or computations may be presented in a specific order, this order may be changed in different particular implementations. In some particular implementations, multiple steps shown as sequential in this specification can be performed at the same time.

Particular implementations may be implemented in a non-transitory computer-readable storage medium (also referred to as a machine-readable storage medium) for use by or in connection with the instruction execution system, apparatus, or device. Particular implementations can be implemented in the form of control logic in software or hardware or a combination of both. The control logic when executed by one or more processors is operable to perform the implementations described herein and other functions. For example, a tangible medium such as a hardware storage device can be used to store the control logic, which can include executable instructions.

A "processor" may include any suitable hardware and/or software system, mechanism, or component that processes data, signals or other information. A processor may include a system with a general-purpose central processing unit, multiple processing units, dedicated circuitry for achieving functionality, or other systems. Processing need not be limited to a geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory. The memory may be any suitable data storage, memory and/or non-transitory computer-readable storage medium, including electronic storage devices such as random-access memory (RAM), read-only memory (ROM), magnetic storage device (hard disk drive or the like), flash, optical storage device (CD, DVD or the like), magnetic or optical disk, or other tangible media suitable for storing instructions (e.g., program or software instructions) for execution by the processor. For example, a tangible medium such as a hardware storage device can be used to store the control logic, which can include executable instructions. The instructions can also be contained in, and provided as, an electronic signal, for example in the form of software as a service (SaaS) delivered from a server (e.g., a distributed system and/or a cloud computing system).

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

What is claimed is:

1. A system comprising:
one or more processors; and
logic encoded in one or more non-transitory computer-readable storage media for execution by the one or more processors and when executed operable to cause the one or more processors to perform operations comprising:
implementing a real-time decision engine comprising a location-aware privileged account access module and a privileged session module operating in conjunction with a conditional access proxy and a distributed event streaming platform;
receiving, at the real-time decision engine from a mobile device via the conditional access proxy, an access request for privileged credentials;
accessing one or more predetermined conditional access policies at the real-time decision engine;
receiving location data associated with the mobile device as transmitted to the real-time decision engine;
performing, by the real-time decision engine, a plurality of location-aware verification checks comprising a client-side verification and a server-side verification based on a continuous evaluation of the one or more predetermined conditional access policies with the location data comprising location events derived from a mobile application feed and from an indoor positioning feed via the distributed event streaming platform; and
determining, by the real-time decision engine, whether to grant or to deny the access request based on results from the performing the plurality of location-aware verification checks.

2. The system of claim 1, wherein at least one of the predetermined conditional access policies requires at least one location-aware verification check associated with an access control system to pass in order to grant the access request.

3. The system of claim 1, wherein at least one of the predetermined conditional access policies requires at least one location-aware verification check associated with a proximity beacon system to pass in order to grant the access request.

4. The system of claim 1, wherein at least one of the predetermined conditional access policies requires at least one location-aware verification check associated with an ultrasonic tracking system that encodes ultrasonic sounds with the location data to create at least one from among advertisements and beacons to represent a building and a floor in the building to pass in order to grant the access request.

5. The system of claim 1, wherein at least one of the predetermined conditional access policies requires at least one location-aware verification check associated with a wireless positioning system to pass in order to grant the access request.

6. The system of claim 1, wherein at least one of the predetermined conditional access policies requires at least one location-aware verification check associated with an ultra-wideband technology system to pass in order to grant the access request.

7. The system of claim 1, wherein the logic when executed is further operable to cause the one or more processors to perform operations comprising:
continuously re-evaluating the location data based on one or more location data access policies; and
determining whether to block access to resources and revoke credentials based on changes to location data.

8. A non-transitory computer-readable storage medium with program instructions stored thereon, the program instructions when executed by one or more processors are operable to cause the one or more processors to perform operations comprising:
implementing a real-time decision engine comprising a location-aware privileged account access module and a privileged session module operating in conjunction with a conditional access proxy and a distributed event streaming platform;
receiving, at the real-time decision engine from a mobile device via the conditional access proxy, an access request for privileged credentials;
accessing one or more predetermined conditional access policies at the real-time decision engine;
receiving location data associated with the mobile device as transmitted to the real-time decision engine;
performing, by the real-time decision engine, a plurality of location-aware verification checks comprising a client-side verification and a server-side verification based on a continuous evaluation of the one or more predetermined conditional access policies with the location data comprising location events derived from a mobile application feed and from an indoor positioning feed via the distributed event streaming platform; and
determining, by the real-time decision engine, whether to grant or to deny the access request based on results from the performing the plurality of location-aware verification checks.

9. The computer-readable storage medium of claim 8, wherein at least one of the predetermined conditional access policies requires at least one location-aware verification check associated with an access control system to pass in order to grant the access request.

10. The computer-readable storage medium of claim 8, wherein at least one of the predetermined conditional access policies requires at least one location-aware verification check associated with a proximity beacon system to pass in order to grant the access request.

11. The computer-readable storage medium of claim 8, wherein at least one of the predetermined conditional access policies requires at least one location-aware verification check associated with an ultrasonic tracking system that encodes ultrasonic sounds with the location data to create at least one from among advertisements and beacons to represent a building and a floor in the building to pass in order to grant the access request.

12. The computer-readable storage medium of claim 8, wherein at least one of the predetermined conditional access policies requires at least one location-aware verification check associated with a wireless positioning system to pass in order to grant the access request.

13. The computer-readable storage medium of claim 8, wherein at least one of the predetermined conditional access policies requires at least one location-aware verification check associated with an ultra-wideband technology system to pass in order to grant the access request.

14. The computer-readable storage medium of claim 8, wherein the instructions when executed are further operable to cause the one or more processors to perform operations comprising:
   continuously re-evaluating the location data based on one or more location data access policies; and
   determining whether to block access to resources and revoke credentials based on changes to location data.

15. A computer-implemented method comprising:
   implementing a real-time decision engine comprising a location-aware privileged account access module and a privileged session module operating in conjunction with a conditional access proxy and a distributed event streaming platform;
   receiving, at the real-time decision engine from a mobile device via the conditional access proxy, an access request for privileged credentials;
   accessing one or more predetermined conditional access policies at the real-time decision engine;
   receiving location data associated with the mobile device as transmitted to the real-time decision engine;
   performing, by the real-time decision engine, a plurality of location-aware verification checks comprising a client-side verification and a server-side verification based on a continuous evaluation of the one or more predetermined conditional access policies with the location data comprising location events derived from a mobile application feed and from an indoor positioning feed via the distributed event streaming platform; and
   determining, by the real-time decision engine, whether to grant or to deny the access request based on results from the performing the plurality of location-aware verification checks.

16. The computer-implemented method of claim 15, wherein at least one of the predetermined conditional access policies requires at least one location-aware verification check associated with an access control system to pass in order to grant the access request.

17. The computer-implemented method of claim 15, wherein at least one of the predetermined conditional access policies requires at least one location-aware verification check associated with a proximity beacon system to pass in order to grant the access request.

18. The computer-implemented method of claim 15, wherein at least one of the predetermined conditional access policies requires at least one location-aware verification check associated with an ultrasonic tracking system that encodes ultrasonic sounds with the location data to create at least one from among advertisements and beacons to represent a building and a floor in the building to pass in order to grant the access request.

19. The computer-implemented method of claim 15, wherein at least one of the predetermined conditional access policies requires at least one location-aware verification check associated with a wireless positioning system to pass in order to grant the access request.

20. The computer-implemented method of claim 15, wherein at least one of the predetermined conditional access policies requires at least one location-aware verification check associated with an ultra-wideband technology system to pass in order to grant the access request.

\* \* \* \* \*